Nov. 2, 1954      C. A. BICKFORD      2,693,202
FLUID-CONDUCTING COUPLING FOR ROTARY VALVES
Filed July 20, 1953      2 Sheets-Sheet 1

INVENTOR
CHARLES A. BICKFORD
BY *Chapin & Neal*
ATTORNEYS

Nov. 2, 1954 C. A. BICKFORD 2,693,202
FLUID-CONDUCTING COUPLING FOR ROTARY VALVES
Filed July 20, 1953 2 Sheets-Sheet 2

INVENTOR
CHARLES A. BICKFORD
BY *Chapin & Neal.*
ATTORNEYS

United States Patent Office 2,693,202
Patented Nov. 2, 1954

2,693,202

FLUID-CONDUCTING COUPLING FOR ROTARY VALVES

Charles A. Bickford, Holyoke, Mass., assignor to Gilbert & Barker Manufacturing Company, West Springfield, Mass., a corporation of Massachusetts Application July 20, 1953, Serial No. 369,026

2 Claims. (Cl. 137—625.31)

This invention relates to an improved fluid-conducting coupling connection between a passage in a rotatable valve, and a passage which is stationary, for permitting relative rotation of the coupled parts without loss of fluid conducted therethrough.

The invention, while capable of general application, finds one advantageous use in connection with the rotatable distributing valve of a piston meter, such for example as the one disclosed in De Lancey Patent No. 2,121,120, granted June 21, 1938. This patent discloses a coupling, which accomplishes the same purposes above set forth and which consists of an annular seal ring and an expansible bellows connecting such ring to the stationary passage, the seal ring being pressed against a face of the rotary valve by the spring of the bellows. While couplings of this type have been extensively used, they have not proved altogether satisfactory because the metal bellows is liable to crack under repeated flexures and require replacement relatively early. The life of the bellows coupling seldom approaches the life of the other parts of the meter.

This invention provides a better coupling for the purposes described, calculated to have a much longer life of useful service, being simple in construction, efficient in operation and capable of manufacture at relatively low cost.

More particularly, the invention has for an object the provision of a coupling for the purposes described consisting of relatively-slidable telescoping sleeves, one of which is fixed to a stationary conduit and the other of which has an outturned flange that is pressed by a spring into sealing engagement with the valve, and this same spring also serves to press a packing member into sealing engagement with the relatively-slidable sleeves.

The invention has for a further object the provision in a coupling of the type described, of a single means which prevents relative rotation of the telescoped sleeves and limits the axial extension thereof under the force of the spring.

These and other objects will more particularly appear from the following description of one illustrative embodiment of the invention in the accompanying drawings, in which.

Figure 1:
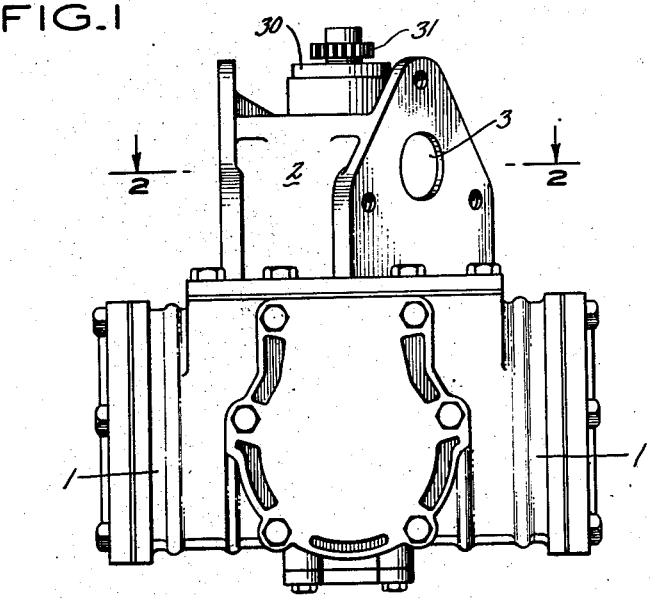
Fig. 1 is a small-scale, exterior elevational view of a piston meter embodying the invention.
Figure 2:
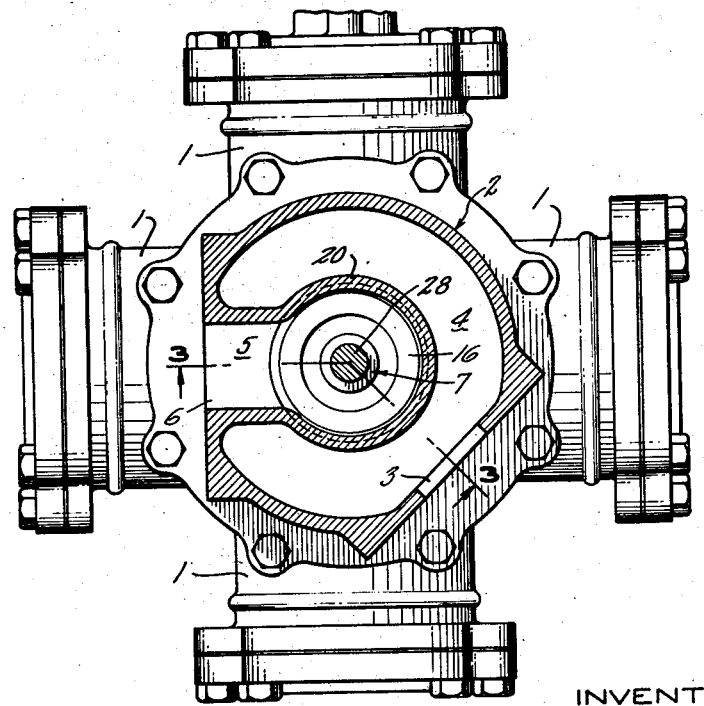
Fig. 2 is a sectional plan view, taken on the line 2—2 of Fig. 1 and drawn to a larger scale.
Figure 3:
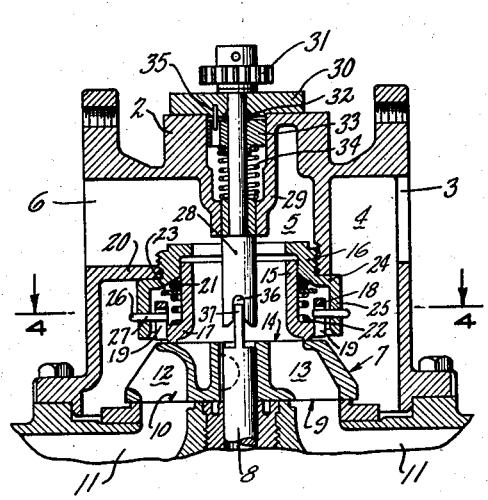
Fig. 3 is a fragmentary sectional elevational view taken on the line 3—3 of Fig. 2.
Figure 4:
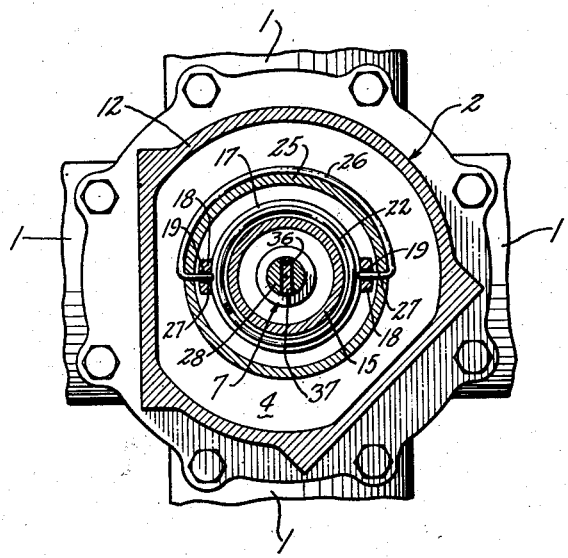
Fig. 4 is a fragmentary sectional plan view taken on the line 4—4 of Fig. 3.

In these drawings, the invention has been shown, by way of illustrative example, in connection with a piston meter, which is of the same kind disclosed in the above-named patent. Such a meter is shown in Fig. 1 and embodies a lower housing, which has a plurality of measuring cylinders 1, and an upper housing 2, which has an inlet 3 for the liquid to be metered. This housing 2, as shown in Figs. 2, 3 and 4, also has an inlet chamber 4, an outlet passage 5, an outlet 6 and a rotatable distributing valve 7 (Fig. 3) for directing liquid from the inlet chamber to the cylinders 1 of the meter and directing liquid from these cylinders to the outlet chamber 5. The valve 7 is slidably keyed to a vertical shaft 8, which is driven by the pistons in the cylinders 1, as shown in said patent. The valve has a lower face 9, which engages a seat 10 on the meter body. This seat contains a series of ports which are the ends of passages 11 leading one from each cylinder 1. The valve 7 has a passage 12 leading from its lower face 9 to its periphery and there communicating with inlet chamber 4. The valve also has a passage 13 extending through it from the face 9 to an upper and parallel face 14.

This invention is directed to an improved extensible and contractible means, which provides a fluid-conducting connection between a valve passage, such as 13, and a passage, such as 5, and which provides a fluid-tight engagement with the rotating valve. Such means is generally useful in connection with any rotatable valve having a fluid-conducting passage therethrough irrespective of the fluid, the direction of flow thereof and the machine, which the valve controls, whether such machine be a meter, motor, engine or pump.

This improved fluid-conducting means is based on two telescoping sleeves 15 and 16 which are located coaxially of the valve. The inner sleeve 15 has an annular flange 17, outturned from its lower end and bearing against the upper face 14 of the valve. The interior of this sleeve communicates constantly with the passage 13 in the valve. On this flange 17 at diametrically opposite locations are two upstanding lugs 18 each having a vertical slot 19 therein. The outer tube 16 slidably receives the upper end of tube 15 and is suitably fixed, as by the screw threads shown, in the horizontal portion of the partition 20, which separates the inlet chamber 4 from the outlet passage 5. The lower end of sleeve 16 is countersunk, affording a recess to receive a rubber-like O-ring 21, which is pressed into sealing engagement with the telescoping tubes by means of a coil spring 22, having a seat on flange 17 and acting on the O-ring through a washer 23. The spring also presses the flange 17 against the upper face 14 of valve 7, providing a fluid-tight seal between the lower end of the inner sleeve 15 and the valve.

The lower end of the outer sleeve 16 has an outturned annular flange 24, which seats against the lower face of the bottom portion of partition wall 20. From this flange depends an annular rim 25, which is disposed in radially-spaced coaxial relation with the lower portion of sleeve 15 and encloses the spring, washer, O-ring and the lugs 18. A semi-circular wire 26, extending half-way around the exterior of rim 25, has two ends 27 which are turned radially inward and extend through the rim 25 and into the slots 19 in lugs 18. These ends 27 prevent separation of the telescoping sleeves 15 and 16 under the force of spring 22 during assembly of the parts and they also prevent relative rotation of the sleeves.

It is usual in the case of a meter, for the valve shaft 8 to drive a shaft, which passes out of the housing 2 and which is adapted for driving connection to a register which indicates the amount of fluid that passes through the meter. Such a shaft is shown at 28, having a lower bearing in the lower end of a sleeve 29, which depends from the top wall of housing 2 into the outlet chamber 5, and an upper bearing in a disk 30, which is secured to the top of housing 12 and closes the upper end of sleeve 29. Shaft 28 is held against axial displacement by the engagement of a shoulder thereon with the lower end of the lower bearing in sleeve 29 and by a gear 31 which is fixed to its upper end and engages disk 30. Gear 31 forms one element of a driving transmission for the register. A rubber-like O-ring 32 is pressed by a gland 33, actuated by a spring 34, into sealing engagement with the shaft 28 and disk 30. A pin 35, fixed in and depending from disk 30, engages in a notch in the periphery of gland 33 and holds the latter from rotation. The lower end of shaft 28 has a diametrical slot 36 therein to receive a tongue 37 of rectangular cross section that upstands from the upper end of shaft 8.

In assembling the parts, the valve 7 is mounted on the upper end of shaft 8 before the upper housing 2 is put in place. The shaft 28 is mounted in the upper housing before the latter is put in place on the body of the meter. The parts of the coupling are adapted to be assembled at the bench in the following manner. With the flange 17 of the inner sleeve resting on the bench, the spring 22, washer 23 and O-ring 21 are successively slipped over the upstanding sleeve 15 and then the outer sleeve 16 is pushed onto the upper end of the inner sleeve and pressed downwardly as far as possible (until the washer 23 abuts the upper ends of the lugs 18). Then, the ends 27 of the semi-circular wire 26 are sprung apart and inserted through rim 25. Then the rim 25 is turned until such ends snap into the slots 19 in the lugs. Then, the pressure on the outer sleeve is relaxed and the coupling parts will be maintained in assembled relation with the sleeve 15 extended as far as possible from sleeve 16. The assembly, just described, is then secured to the housing 2 by threading sleeve 16 into the opening provided in the lower wall of the outlet chamber 5. Then the housing 2 is put in position on the body of the meter, the tongue 37 on shaft 7 being guided into slot 36 by the flaring entrance provided in the latter. Then, the housing 2 is fastened to the meter body and, in this operation, the inner sleeve 15 which had theretofore been extended as far as possible, will be compressed into the position shown.

The invention provides an improved construction of coupling, of the type having telescoping sleeves, for conducting fluid between a passage in a rotary valve and a stationary passage. This construction is characterized in that the packing, gland and spring are protected and concealed within an outer rim on the outer telescoping sleeve; in that the spring, which extends the inner sleeve from the outer sleeve and presses the flange of the inner sleeve against the valve, also actuates the gland to compress the packing into sealing relation with the relatively slidable portions of the two sleeves; and in that radial pins in the aforesaid rim project into slots in lugs movable with the inner sleeve in order to hold the latter against rotation and limit the extent of axial separation of the two sleeves under the force of the aforesaid spring.

What is claimed is:

1. The combination with a rotary valve, having a first face engaged with a ported seat, a second and parallel face, and a fluid-conducting passage interconnecting said faces; and a stationary conduit, having an open end located coaxially of the valve and confronting the second face thereof in axially-spaced relation; of means for conducting fluid between said end and passage and comprising, an outer sleeve fixed at one end in said open end and located coaxially thereof, an inner sleeve having one end slidable in the outer sleeve and a flange outturned from its other end and engaged with the second face of the valve, a pair of lugs one at each of two diametrically opposite locations on said flange and extending away from the flange and valve parallel with the axis of the sleeves, an annular ring fixed to and extending outwardly from the outer sleeve, a spring coiled around the inner sleeve and acting between said ring and flange to yieldingly hold the latter engaged with the second face of the valve; an annular rim fixed to said ring and extending toward said second face, encompassing said inner sleeve in radially-spaced coaxial relation and encompassing said flange and lugs; said lugs each having a longitudinal slot therein, and a pair of pins mounted at diametrically opposite points in said rim and projecting radially inward one into each of said slots, whereby to hold the inner sleeve from rotation and to limit the axial extension of the inner sleeve by said spring.

2. The combination with a rotary valve, having a first face engaged with a ported seat, a second and parallel face, and a fluid-conducting passage interconnecting said faces; and a stationary conduit, having an open end located coaxially of the valve and confronting the second face thereof in axially-spaced relation therewith; of means for conducting fluid between said end and passage and comprising, an outer sleeve fixed at one end in said open end and located coaxially thereof, an inner sleeve having one end slidable in the outer sleeve and a flange outturned from its other end and engaged with the second face of the valve, a pair of lugs one at each of two diametrically opposite locations on said flange and extending away from the flange and valve parallel with the axis of the sleeves, an annular ring fixed to and extending outwardly from the outer sleeve, a spring coiled around the inner sleeve and acting between said ring and flange to yieldingly hold the latter engaged with the second face of the valve; an annular rim fixed to said ring and extending toward said second face, encompassing said inner sleeve in radially-spaced coaxial relation and encompassing said spring, flange and lugs, said lugs each having a longitudinal slot therein, and a semi-circular wire engaging the outer periphery of said rim and having at its ends radially-inturned parts which pass through said rim and enter one into each of said slots, whereby to hold the inner sleeve from rotation and to limit the axial extension of the inner sleeve by said spring.

References Cited in the file of this patent

UNITED STATES PATENTS

| Number | Name | Date |
|---|---|---|
| 2,116,265 | Hejduk | May 4, 1938 |
| 2,121,120 | De Lancey | June 21, 1938 |
| 2,519,574 | Holl | Aug. 22, 1950 |
| 2,626,166 | Fawick | Jan. 20, 1953 |

FOREIGN PATENTS

| Number | Country | Date |
|---|---|---|
| 625,993 | Great Britain | July 7, 1949 |